July 7, 1959     E. P. SCHRANK     2,893,172
SIDEWALL BUFFING MACHINE FOR PNEUMATIC TIRES
Filed Sept. 17, 1957     5 Sheets-Sheet 1

INVENTOR.
Edwin P. Schrank
BY
William Cleland
Attorney

July 7, 1959   E. P. SCHRANK   2,893,172
SIDEWALL BUFFING MACHINE FOR PNEUMATIC TIRES
Filed Sept. 17, 1957   5 Sheets-Sheet 2

INVENTOR.
Edwin P. Schrank
BY
William Cleland
Attorney

July 7, 1959

E. P. SCHRANK 2,893,172

SIDEWALL BUFFING MACHINE FOR PNEUMATIC TIRES

Filed Sept. 17, 1957

INVENTOR.
Edwin P. Schrank

BY
William Cleland
Attorney

July 7, 1959 E. P. SCHRANK 2,893,172
SIDEWALL BUFFING MACHINE FOR PNEUMATIC TIRES
Filed Sept. 17, 1957 5 Sheets-Sheet 4

INVENTOR.
Edwin P. Schrank
BY
William Cleland
Attorney

July 7, 1959      E. P. SCHRANK      2,893,172
SIDEWALL BUFFING MACHINE FOR PNEUMATIC TIRES
Filed Sept. 17, 1957      5 Sheets-Sheet 5

INVENTOR.
Edwin P. Schrank
BY William Cleland
Attorney

United States Patent Office 2,893,172
Patented July 7, 1959

2,893,172

SIDEWALL BUFFING MACHINE FOR PNEUMATIC TIRES

Edwin P. Schrank, Akron, Ohio, assignor to Seiberling Rubber Company, Akron, Ohio, a corporation of Delaware Application September 17, 1957, Serial No. 684,548

30 Claims. (Cl. 51—3)

This invention relates to machines for buffing white sidewalls of pneumatic tires.

In the manufacture of a white sidewall tire, there may be areas where excess black rubber overlaps the white sidewall rubber during the usual vulcanizing process. Moreover, during the manufacturing process, the white sidewall rubber frequently becomes discolored or soiled, and before the vulcanized tires can be marketed, buffing operations are necessary to make the sidewalls uniformly white and smooth, as well as to remove the excess black rubber to define sharp lines of demarcation between the two kinds of rubber. In the past, such sidewall buffing operations have been more or less uncertain as to results for various reasons, and have been generally slow and uneconomical.

One object of the invention is to provide improved white sidewall buffing apparatus which is semi-automatic and continuously operable to buff a tire sidewall, first to abrade a predetermined thickness of rubber therefrom, and then to buff or polish the abraded surface to have a uniformly smooth white finish.

Another object of the invention is to provide apparatus of the character described, wherein improved means is provided for quickly removably mounting a tire casing with the annular beads thereof in air-pressure sealing relation, and including means for inflating the tire casing.

Another object of the invention is to provide a tire buffing machine of the character described, in use of which the operator at all times has a full view of the progress of the buffing operations, and can effectively control the uniformity of the buffing and quality of the finished work.

Another object of the invention is to provide tire mounting means including relatively movable tire bead seating and air-sealing members, wherein is provided improved self-adjusting means for air-sealing the tire beads upon relative movement of the members inwardly of each other initially to engage the tire beads in seating relation, and which are further self-adjusting to present the tire in requisite distended condition for a buffing or like operation.

Another object of the invention is to provide tire mounting and bead sealing means of the character described in the preceding paragraph, wherein relative movement of said members for removal of the tire is self-operating to deflate the same.

Still another object of the invention is to provide a tire buffing machine of the character described, including improved means for maintaining the tire sidewall in requisite firmly distended condition for application of abrading means thereto, and also including an improved mechanism for conforming the abrading means to a transversely arcuate shape of the sidewall as the abrading means is automatically progressively advanced radially of the tire.

These and other objects of the invention will be manifest from the following brief description and the accompanying drawings.

Referring to Figures 1 to 3, 6 and 7, the improved buffing machine 10 includes generally a tire mounting and rotating unit 11, a sidewall abrading unit 12, and a sidewall polishing unit 13.

Figure 1:
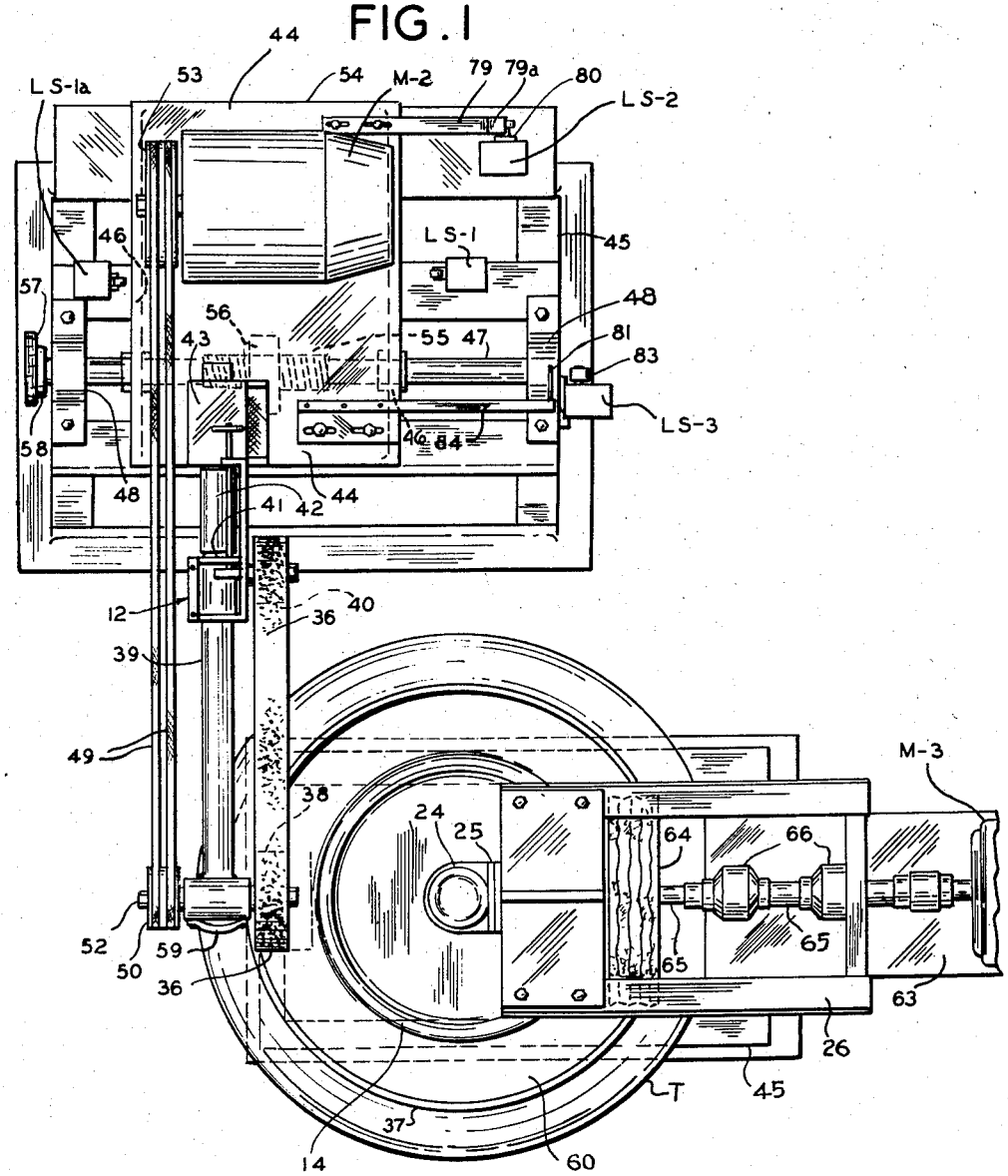
Figure 1 is a top plan view of a sidewall buffing machine embodying the features of the invention.
Figure 6:
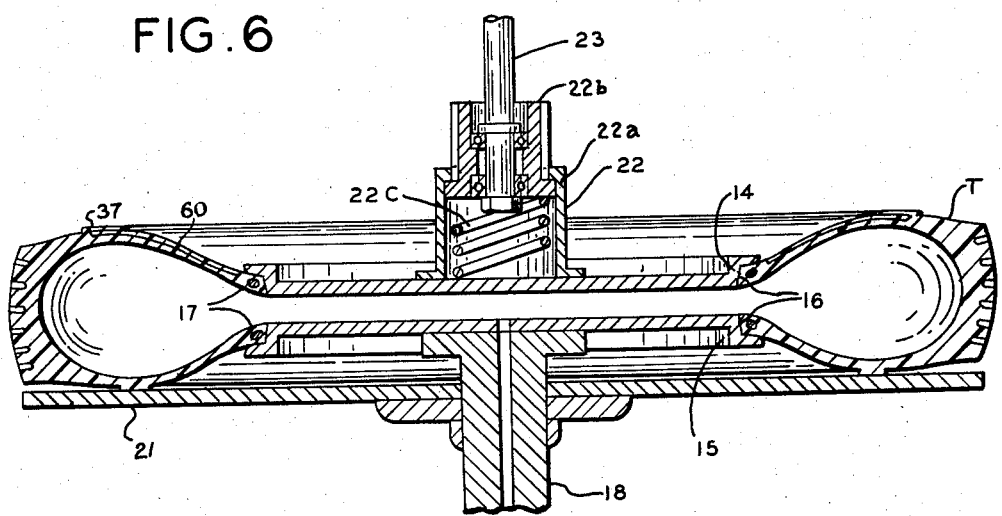
Figure 6 is an enlarged fragmentary cross-section illustrating the tire mounting and air-sealing means shown in Figure 2, in a position of initial operation prior to inflation of the tire.

For air-sealing the openings defined by the tire beads 17, 17 the tire mounting unit 11 may include upper and lower tire bead sealing discs or closure members 14 and 15, respectively, having inwardly oppositely disposed annular bead seats 16, 16 at the marginal edges thereof for air-sealing reception of the bead portions 17, 17 of a tire T, as best shown in Figures 1 and 6. Lower sealing member 15 is mounted to rotate in a horizontal plane by being affixed to the upper end of a vertical shaft 18 which is journalled in bearing means 19, supported on a tire-mounting frame 20. A circular table 21, non-rotatably secured to shaft 18, is adapted to support the lower sidewall portion of the tire T positioned between the bead-sealing members. Upper sealing member 14 may be mounted in superposed relation to the lower member 15, to be rotatable therewith in the relative position shown in full lines in Figure 2, and to be axially movable to the chain-dotted position, as for insertion and removal of tire T in a manner to be described. Accordingly, upper member 14 may be affixed to a bearing device 22 on the lower end of a piston rod 23 which extends downwardly from an air cylinder 24 on an overhanging bracket 25 on an upright extension 26 of frame 20.

Shaft 18 is rotated at predetermined speed by a motor M–1 mounted on frame 20, through a chain drive 27 to a sprocket 28, and a clutch 29, said clutch being actuated by a pivoted saddle 30 having an extension 31 connected to a piston 32 of an air-cylinder 33. Actuation of the clutch 29 is effective to rotate shaft 18 and the lower sealing member 15 thereon, and thereby, through tire T, to rotate the upper member 14 on piston rod 23.

Bearing device 22 may include a cylindrical housing part 22a affixed to the upper sealing member 14, and a plunger part 22b, rotatably secured to the lower end of piston rod 23, and having its lower end axially shiftably, but non-rotatably keyed within the housing. Normally the plunger part 22b is held in an extended position with reference to the housing part, by a compression spring 22c, as best shown in Figure 6. Thus, when a tire is initially yieldingly engaged between members 14 and 15, the inherent resiliency of the tire is insufficient to compress the spring 22c but sufficient to position the bead portions 17 in air-sealing relation in the bead seats 16. Accordingly, when pressurized air is subsequently admitted between the members 14 and 15, the tire will be distended against the resiliency of spring 22c, toward the limit of separation of members 14 and 15, as best shown in Figure 7, in which the parts are in the operative positions illustrated in Figure 2.

Figure 2:
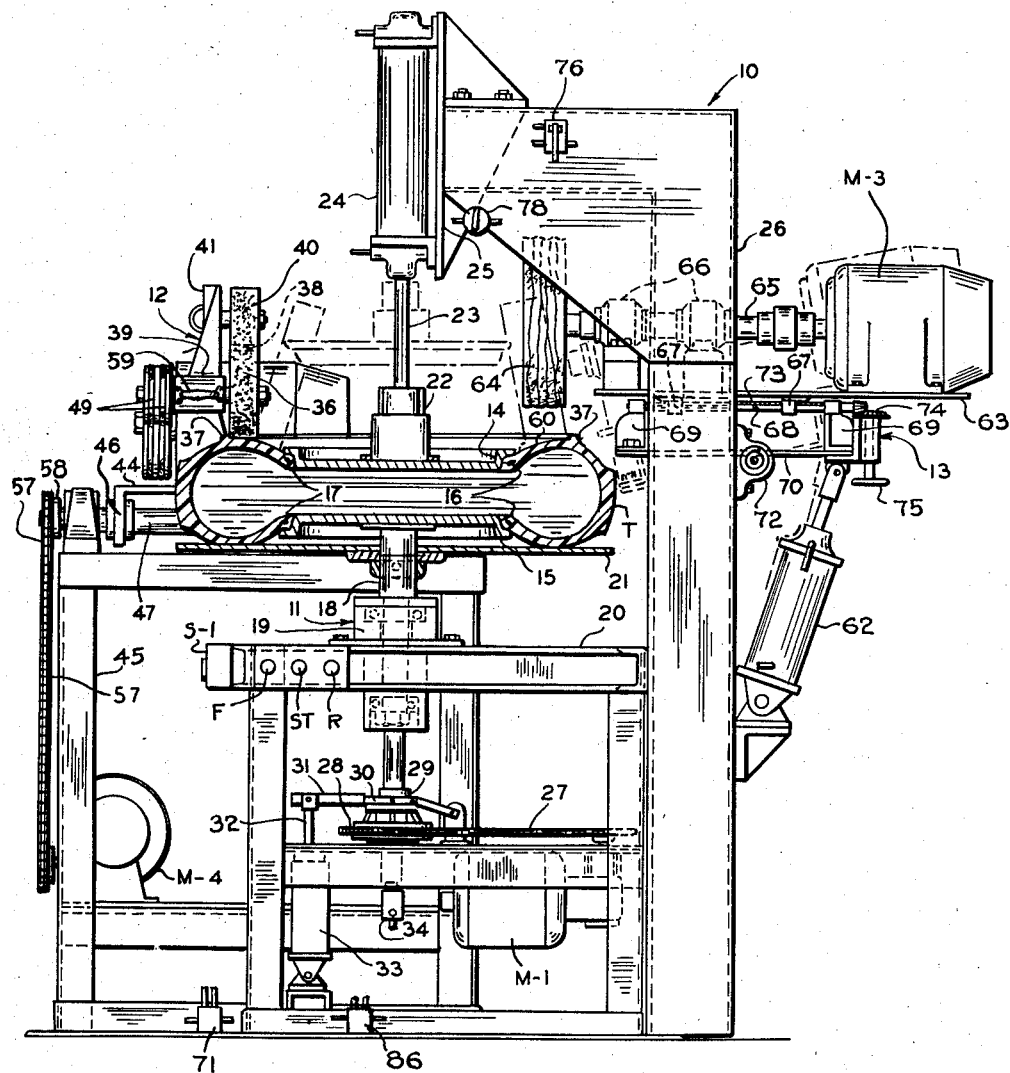
Figure 2 is a front elevation thereof, partly broken away and in section, through the center of a tire being buffed in the machine.
Figure 7:
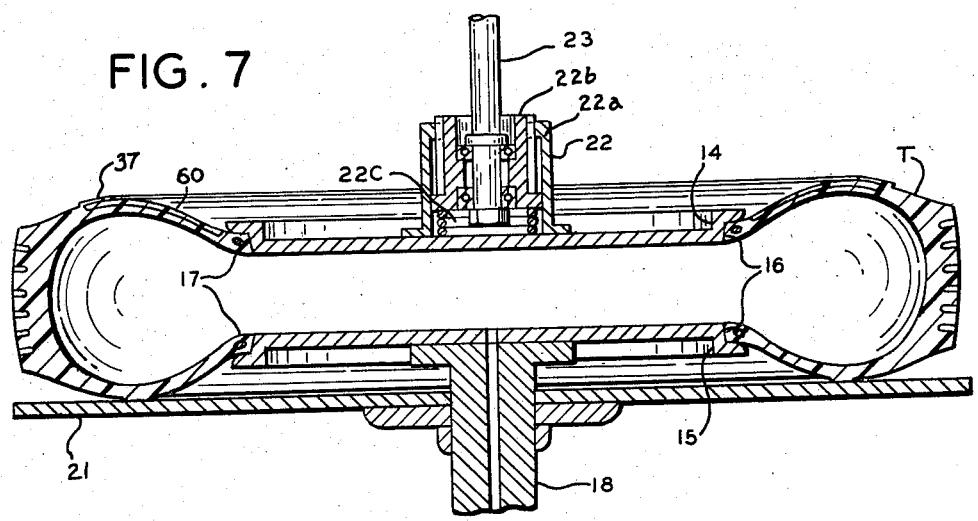
Figure 7 is a view similar to Figure 6, illustrating the corresponding parts in a condition in which the tire has been inflated.

The tire T, in the position best shown in Figures 2 and 7, is inflated with pressurized air from a suitable source of supply (not shown) through a rotary air valve 34 of known type, and through shaft 18 in a manner to be described later.

The abrading unit 12 includes a driven abrasive-coated band 36 adapted to be moved against the upwardly presented white sidewall of tire T, in an annular transversely arcuate area between the usual annular curb rib 37 and corresponding bead portion 17. This driven band is manipulated to conform a moving portion thereof to the transverse arc of the sidewall while being progressively moved transversely or inwardly of the center of the tire in radial direction, thereby to remove a predetermined relatively slight thickness of surface rubber.

Figure 3:
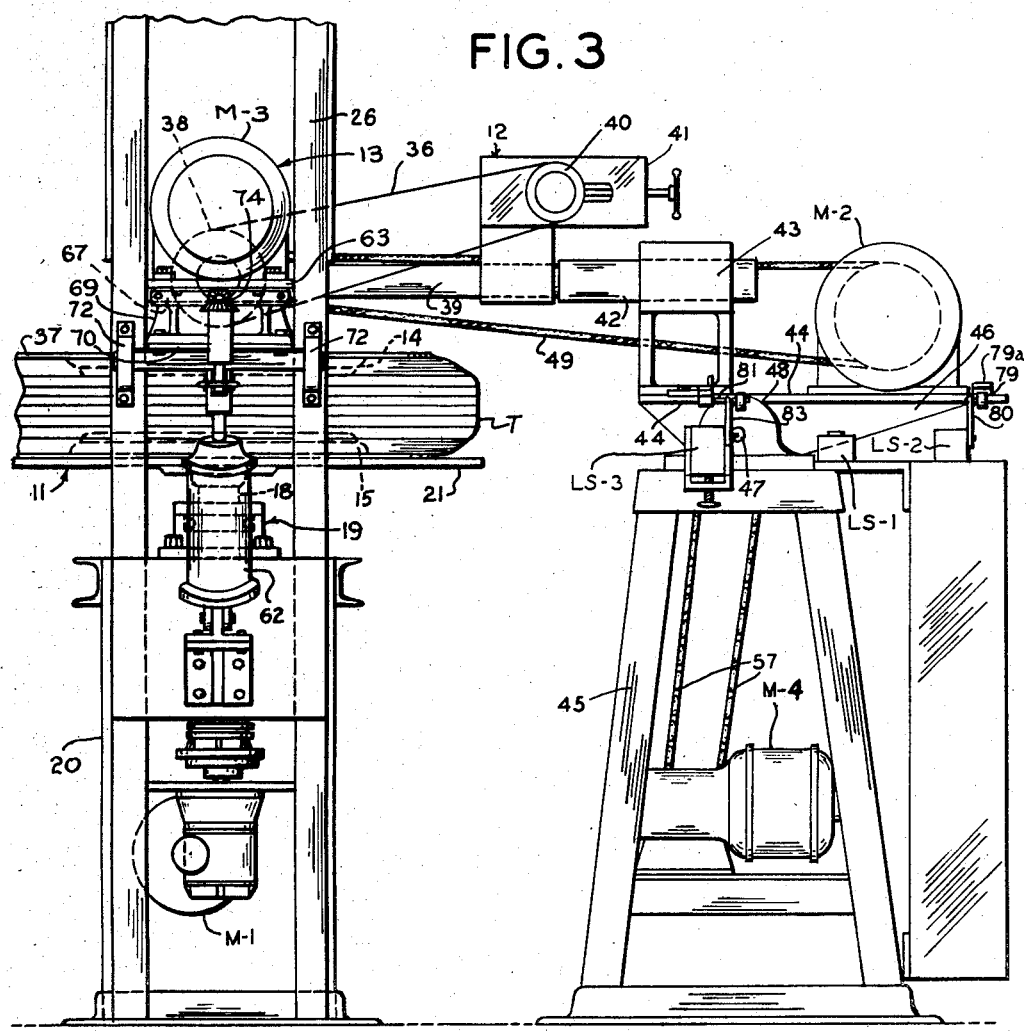
Figure 3 is an end elevation of the machine as viewed from the right of Figure 1.

Band 36 may be mounted between a driven roller 38, on the forward end of a forwardly extending operating member or arm 39, and a tension-adjustable idler roller 40 on a bracket 41, affixed on the arm rearwardly of the driven roller. Arm 39 is journalled in a sleeve 42 to rotate about an axis thereof, the sleeve being non-rotatably mounted on a support constituting a supporting bracket 43 affixed on a swinging table 44 on an auxiliary frame 45, rearwardly of the tire mounting unit. The table 44 has spaced lugs 46, 46 on the underside thereof axially shiftably pivoted on a shaft 47 (see Figures 1, 2 and 3), which is journalled between two bearings 48, 48 on frame 45. For driving the band roller 38, V-belts 49, 49 extend from a driven pulley 50 on an extension of the band roller shaft 52, to a pulley 53 on a motor M–2 secured to a rearward extension 54 of swinging table 44, the motor also serving as a counter-weight, which normally retains the table 44 and associated parts thereon in an inoperative horizontal position in which the free forward end of band 36 is elevated above the tire T, as best shown in Figures 2 and 3. For progressively moving the swinging table 44 axially on the rod 47, the latter has a central threaded portion 55 received through a nut 56 (Figure 1) which is secured to the underside of the table, and a reversing motor M–4 drives a chain 57 received over a sprocket 58 on shaft 47.

Thus, while motor M–2 is operating to move the abrasive band 36, the operator in the meantime having grasped a handle 59 on the free end of arm 39, may now urge the arm downwardly to contact the moving band 36 with the tire sidewall 60.

Motor M–4 may be operated in a manner to be described later, to move the table 44 transversely or axially of shaft 47, initially from left to right as viewed in Figures 1 and 2. While the arm 39 is moved to the right with table 44, as described, the operator may by twisting handle 59 turn the arm in its sleeve 42 to conform the abrasive band to the transverse curvature of said sidewall portion 60. By means in the electrical circuit (Figure 4) also to be described later, movement of table 44 to the right is reversed at a point short of engagement of the corresponding edge of the abrasive band 36 with the upper bead-sealing member 14 (see chain-dotted lines in Figures 1 and 2). By means in the same electrical circuit, the table is stopped at the original starting point, assuming that the operator has previously allowed the arm 39 to be swung upwardly, aided by the counterbalancing weight of the motor M–2, to the inoperative position best shown in full lines in Figures 2 and 3.

After the aforementioned abrading operation has been completed, said electrical circuit (Figure 4) is effective to actuate an air-cylinder 62 to pivot a swinging table 63 of polishing unit 13, thereby to move a revolving rag disc or wheel 64 into full contact with the previously abraded sidewall portion 60 of the rotating tire T. The polishing wheel 64 is keyed on a shaft 65, journalled on bearings 66, 66 on table 63, and rotated by a motor M–3, also mounted on said table. Timing of the polishing operation is controlled by timer means TR, in a manner to be described later.

For adjusting the polishing wheel 64 horizontally toward and from the tire T, the table 63 may have spaced cross-bars 67, 67 on the underside thereof axially shiftably mounted on spaced rods 68, 68 supported between axially spaced brackets 69, 69 of a pivot plate 70, which plate is pivoted between spaced bearings 72, 72 on the frame extension 26. Adjustment of the table on the rods 68 may be accomplished by a screw shaft 73 rotatably connected between the brackets 69 and threadedly received through one of the cross-bars 67. Screw shaft 73 may be manually rotatable for adjustment of table 63, as by gear means 74 and a hand wheel 75, as best shown in Figures 2 and 3.

Figure 4:
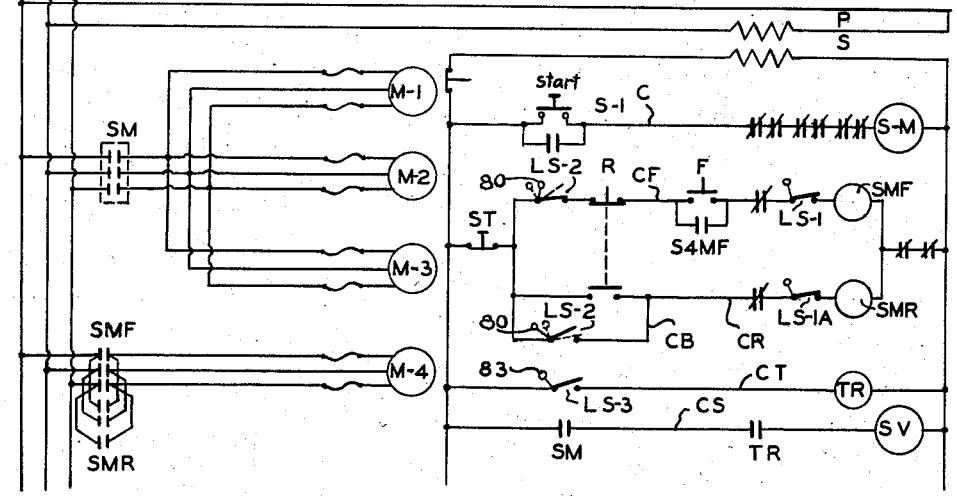
Figure 4 is a schematic wiring diagram of the electrical connections for the machine.
Figure 5:
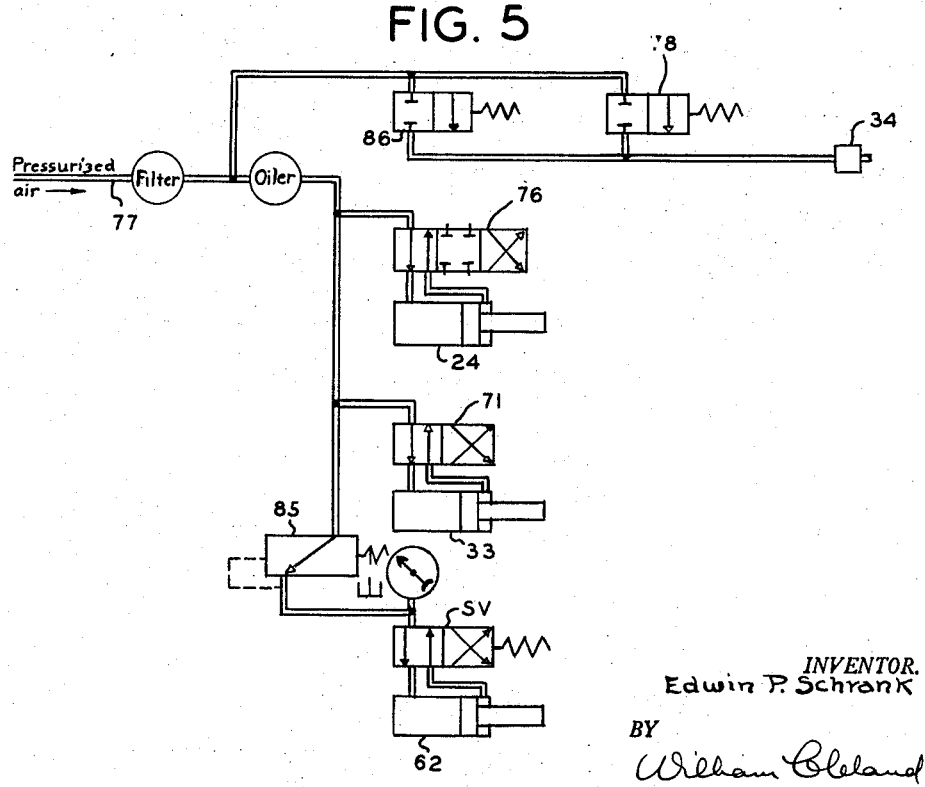
Figure 5 is a schematic diagram of the piping for an air-operated control system for the machine.

Operation of the improved tire buffing machine will be best described by specific reference to the wiring diagram of Figure 4, and general reference to above described mechanisms of Figures 1 to 3, 6 and 7, and to the air-operated control system of Figure 5.

To this end, the operator first pushes a start button of switch S–1 to close a circuit C and actuate solenoid switch SM, and thereby to start motor M–1 of the tire-mounting unit 11, motor M–2 of the sidewall abrading unit 12, and motor M–3 of sidewall polishing unit 13. At this time, clutch means 29 will be in released condition so that the lower bead-sealing member 15 and table 21 are stationary with no tire T supported thereon, sanding belt 36 will be in the elevated position shown in Figure 3, polishing unit 13 will be in the full-line relationship shown in Figure 2, and the upper bead-sealing member 14 will be in the chain-dotted position shown in Figure 2.

Next, the operator places a tire T to be buffed on lower member 15 to have the lowermost bead 17 seated in seat portion 16 of member 15, the tire being partially supported on table 21 (see Figures 2, 3, 6 and 7). Manual operation of a four-way air valve 76 in a pressurized air line 77 (Figures 2 and 5) will then actuate air-cylinder 24 connected thereto, to lower the upper member 14 to seating engagement of the upper tire bead portion 17 in the seat 16 thereof, and thereby initially to air-seal the tire between the members 14 and 15, in the manner shown in Figure 6. The operator then inflates the air-sealed tire T, as by closing a two-way air valve 78 on frame extension 26 and connected to air line 77 (Figure 5), thereby urging the members 14 and 15 apart against the resiliency of compression spring 22c in the bearing device 22, with said air-sealing contact of the tire beads in the seats 17 maintained and further enhanced (Figure 7). The operator then sets the tire in rotary motion by depressing a two-way foot valve 71 which operates cylinder 33 to close clutch 29 for rotation of member 15 and table 21 with shaft 18.

The operator now grasps hand-grip 59 with one hand and urges the counterbalanced arm 39 downwardly to engage the forward end of sanding band 36 with the tire sidewall portion 60. Band 36 is properly positioned initially to abrade the color line adjacent the curb rib 37, usually radially inwardly of the same, by selective manual closing of forward and reverse push-button switches F and R to actuate solenoid switches SMF and SMR, respectively, which control the reversible operation of motor M–4 for driving the traversing screw 47 (Figure 2). When band 36 is thus lowered, however, an adjustable roller-actuating bar 79 on tilting table 44 is raised to be completely out of operating range of an actuating arm 80 of a limit switch LS–2, and thereby to maintain switch LS–2 closed in the forward circuit CF and to maintain the same open through a by-pass circuit CB suitably connected in parallel in a reversing circuit CR (Figures 3 and 4), thereby making possible said selective use of switches F and R in the respective circuits CF and CR, for said forward and reverse travel of table 44. Should the operator, at any time during said forward travel, raise arm 39 and band 36 sufficiently to allow bar 79 to operate switch LS-2, thereby opening and closing circuits CF and CB—CR, respectively, table 44 will travel in reverse direction to the starting or color line position referred to.

Upon completion of said color line at the starting point as described, while the arm 39 is down and switch LS-2 and circuit CS are otherwise in the original Figure 4 condition, the operator by again pushing the forward button F, may cause automatic forward movement of table 44 to the right, as viewed in Figures 1 and 2, until it reaches the end of its forward travel, where it is normally stopped by the operator allowing the counterweighted arm 39 to be raised to inoperative position of the sanding band 36, whereupon roller arm 80 re-engages bar 79 to operate limit switch LS-2, thereby to open forward circuit CF and close reversing circuit CR through by-pass circuit CB. This reverse motor M-4 automatically to return the table 44 to starting position where it is normally stopped by reception of the roller of arm 80 with an off-set end portion 79a to release switch LS-2, thereby to set circuits CF and CR for the next cycle of operation. Otherwise, the extreme reversing travel may be limited by engagement of a safety limit switch LS-1A in reversing circuit CR, with a portion of table 44.

Should the operator fail to so raise the arm 39 for reverse travel of the table 44, it will be stopped at the extreme position of its forward travel by engagement of a portion of the table with a limit switch LS-1 in forward circuit CF.

During the forward travel of the table 44, the operator, by means of hand grip 59, may turn arm 39 in sleeve 42 to conform the abrading band 36 to the transverse curvature of the tire sidewall portion.

At the end, or before the end, of full said automatic forward travel, with arm 39 held down, engagement of a roller arm 83 with a pin 81 on a free end of an adjustable bar 84 on table 44, closes a limit switch LS-3 to start a timer and relay TR in a circuit CT, which in turn operates an electrical circuit CS to a solenoid valve SV connected to pressure regulator 85 in air-pressure line 77 (Figure 5). The valve SV in turn operates cylinder 62 to swing table 63 of the polishing unit in counterclockwise direction on its pivot 72, from the full line position thereof to the chain-dotted position, as shown in Figure 2. This positions rag buffer or polisher 64 against the white sidewall 60 of the rotating tire T, at a point diametrically opposite to the point of contact of abrading band 36 with the tire. Table 44, in the meantime, will have traversed toward its starting position as described. At the end of a preset time cycle of operation of timer TR, as necessary to provide a uniformly smooth surface on the tire sidewall, the solenoid valve SV will be reversely actuated to operate cylinder 62 for return of table 63 and polishing buffer 64 to inoperative condition (see full lines in Figure 2).

At this point the foot valve is actuated to disengage clutch 29 and stop rotation of the tire T. The operator may now release he pressurized air from tire T by actuating handvalve 76 to raise the top sealing member 14 and break the air seal at the tire bead portions. With the top member now raised, the completed tire may be easily removed from the machine.

At any time during the buffing operation, the operator may increase or otherwise vary the tire pressure, either by means of the hand valve 78 or a foot valve 86 (Figures 2 and 5).

By means of the apparatus described, the operator at all times has a full view of the buffing operations and, therefore, may readily vary the operational procedure at any point in the buffing operations. This results in more efficient buffing of the tires, as well as the production of finished tires having uniformly buffed white side walls, regardless of frequent changes in tire sizes being processed.

Thus has been provided a sidewall buffing machine which accomplishes the stated objects of the invention.

Modifications of the invention may be resorted to without departing from the spirit thereof or the scope of the appended claims.

What is claimed is:

1. Apparatus for buffing a sidewall portion of a rubber pneumatic tire, comprising means for rotating the tire about an axis, a sidewall buffing element, mounting means for supporting said buffing element to be swingable about a plurality of axes for movement of the element toward and from contact with the tire sidewall portion and for movement conforming the element to the radially transverse curvature of said sidewall portion, and supporting means supporting said mounting means to be shiftable for movement of the buffing element in direction substantially radially of said axis progressively to remove a predetermined amount of surface rubber from said sidewall portion, control means being provided for selectively moving said supporting means in forward and reverse said radially transverse directions, said control means including means operable by movement of said element away from said sidewall portion for reversing the movement of said supporting means.

2. Apparatus for buffing a sidewall portion of a rubber pneumatic tire, comprising means for rotating the tire about an axis, a sidewall buffing element, mounting means for supporting said buffing element to be swingable about a plurality of axes for movement of the element toward and from contact with the tire sidewall portion and for movement conforming the element to the radially transverse curvature of said sidewall portion, and supporting means supporting said mounting means to be shiftable for movement of the buffing element in direction substantially radially of said axis progressively to remove a predetermined amount of surface rubber from said sidewall portion, control means being provided for selectively moving said supporting means in forward and reverse said radially transverse directions, and including means operable by movement of the element toward and from said sidewall portion to set said control means for said selective forward and reverse movements of the element, said control means including means operable by movement of said element away from said sidewall portion for reversing the movement of said supporting means.

3. Apparatus for buffing a sidewall portion of a rubber pneumatic tire, comprising means for rotating the tire about an axis, a sidewall buffing element, mounting means for supporting said buffing element to be swingable about a plurality of axes for movement of the element toward and from contact with the tire sidewall portion and for movement conforming the element to the radially transverse curvature of said sidewall portion, and supporting means supporting said mounting means to be shiftable for movement of the buffing element in direction substantially radially of said axis progressively to remove a predetermined amount of surface rubber from said sidewall portion, control means being provided for selectively moving said supporting means in forward and reverse said radially transverse directions, and including means operable by movement of the element toward and from said sidewall portion to set said control means for said selective forward and reverse movements of the element, said control means including means operable by movement of said element away from said sidewall portion for reversing the movement of said supporting means, said control means including a device operable by predetermined said forward transverse movement of said element to reverse the transverse movement thereof with said supporting means.

4. Apparatus for buffing a sidewall portion of a rubber pneumatic tire, comprising means for rotating the tire about an axis, a sidewall buffing element, mounting means for supporting said buffing element to be swingable about a plurality of axes for movement of the element toward and from contact with the tire sidewall portion and for movement conforming the element to the radially transverse curvature of said sidewall portion, and supporting means supporting said mounting means to be shiftable for movement of the buffing element in direction substantially radially of said axis progressively to remove a predetermined amount of surface rubber from said sidewall portion, control means being provided for selectively moving said supporting means in forward and reverse said radially transverse directions, and including means operable by movement of the element toward and from said sidewall portion to set said control means for said selective forward and reverse movements of the element, said control means including means operable by movement of said element away from said sidewall portion for reversing the movement of said supporting means, said control means including a device operable by predetermined said forward transverse movement of said element to reverse the transverse movement thereof with said supporting means, said control means including provision for limiting said movement of said mounting means in said radially transverse directions.

5. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, and means operable by predetermined radial movement of the first element to move said second element toward buffing contact thereof with said tire sidewall.

6. Apparatus for buffing sidewall portions of a pneumatic rubber tire, comprising means for rotating the tire about an axis, a first sidewall buffing element, mounting means for supporting said first buffing element to be movable toward and from contact of the element with one sidewall portion of the tire, first supporting means supporting said mounting means to be shiftable for movement of said first buffing element in direction substantially radially of said axis while contacting the tire, and thereby progressively to remove a predetermined amount of surface rubber from said sidewall portion, a second sidewall buffing element, a second supporting means for supporting said second buffing element for movement thereof toward and from said one tire sidewall at a point peripherally spaced from the point of contact of the first element, and power means including a control device, means being provided for selectively shifting said first supporting means in forward and reverse directions radially of said axis.

7. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, control means being provided for selectively moving said first supporting means in forward and reverse said radially transverse directions, including means operable by movement of the element toward and from said sidewall portion to set said control means for said selective forward and reverse movements of the element.

8. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, and control means for selectively moving said first supporting means in forward and reverse said radially transverse directions, and including means operable by movement of the element toward and from said sidewall portion to set said control means for said selective forward and reverse movements of the element, said control means including a device operable by predetermined forward movement of said first buffing element to move said second supporting means to position the said second buffing element against the tire sidewall portion for a predetermined length of time.

9. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, and control means for selectively moving said first supporting means in forward and reverse said radially transverse directions, and including means operable by movement of the element toward and from said sidewall portion to set said control means for said selective forward and reverse movements of the element, said control means including a device operable by predetermined forward movement of said first buffing element to move said second supporting means to position the said second buffing element against the tire sidewall portion for a predetermined length of time, said control means including means operable by movement of said first element away from said sidewall portion for reversing the movement of said first supporting means.

10. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, and control means for selectively moving said first supporting means in forward and reverse said radially transverse directions, and including means operable by movement of the element toward and from said sidewall portion to set said control means for said selective forward and reverse movements of the element, said control means including a device operable by predetermined forward movement of said first buffing element to move said second supporting means to position the said second buffing element against the tire sidewall portion for a predetermined length of time, said control means including means operable by movement of said first element away from said sidewall portion for reversing the movement of said first supporting means, said control means including a device for limiting said movement of said first element in said radially transverse directions.

11. Apparatus for buffing sidewall portions of a pneumatic rubber tire, comprising means for rotating the tire about an axis, a first sidewall buffing element, mounting means for supporting said first buffing element to be movable toward and from contact of the element with the tire sidewall portion, first supporting means supporting said mounting means to be shiftable for movement of said first buffing element in direction substantially radially of said axis progressively to remove a predetermined amount of surface rubber from said sidewall portion, a second sidewall buffing element, a second supporting means for supporting said second buffing element for movement thereof toward and from said tire sidewall at a point spaced from the point of contact of the first element, and control means for selectively moving said first supporting means in forward and reverse said radially transverse directions, and including means operable by movement of the element toward and from said sidewall portion to set said control means for said selective forward and reverse movements of the element, said control means including a device operable by predetermined forward movement of said first buffing element to move said second supporting means to position the said second buffing element against the tire sidewall portion for a predetermined length of time, said control means including means operable by movement of said first element away from said sidewall portion for reversing the movement of said first supporting means, said control means including a device for limiting said movement of said first element in said radially transverse directions, said control means including a device operable by predetermined forward transverse movement of said first element to reverse the transverse movement thereof with said first supporting means.

12. Apparatus for buffing sidewall portions of a rubber pneumatic tires, comprising means for rotating the tire about an axis thereof, a first sidewall buffing element, mounting means for supporting said buffing element to be movable toward and from contact of the buffing element with the tire sidewall portion, means for moving said mounting means to shift the contacting buffing element in a transverse arc in direction substantially radially of said axis of the tire progressively to remove a predetermined amount of surface rubber from said sidewall portion, a second sidewall buffing element, supporting means for supporting said second buffing element for movement thereof toward and from said tire sidewall at a point circumferentially spaced from the point of contact of the first element, and means responsive to predetermined radial movement of the first element in said transverse arc to move said second buffing element toward buffing contact thereof with said tire sidewall.

13. Apparatus as set forth in claim 12, including control means to reverse the movement of said first element after predetermined forward buffing movement thereof.

14. Apparatus as set forth in claim 12, said first buffing element including a continuous surface of abrasive material, and means being provided for moving said continuous surface against the tire in direction substantially tangent to the arcuate path of movement of the sidewall surface portion.

15. Apparatus for buffing sidewall portions of a rubber pneumatic tire having spaced annular bead portions, comprising a pair of closure members having oppositely disposed tire bead engaging seats, means for rotatably mounting said closure members to be axially relatively movable with respect to each other from and toward a position of initial air-sealing engagement of the bead portions in said seats, means for rotating said members with said tire between the same, means connecting with space between said members for inflating said tire, a sidewall buffing element, mounting means for supporting said buffing element to be movable toward and from contact of the element with the tire sidewall portion, means for moving said mounting means to shift the buffing element in direction substantially radially of said axis progressively to remove a predetermined amount of surface rubber from said sidewall portion in a transverse arc thereof, a second sidewall buffing element, supporting means for supporting said second buffing element for movement thereof toward and from said tire sidewall at a point spaced from the point of contact of the first element.

16. Apparatus for buffing sidewall portions of a rubber pneumatic tire having spaced annular bead portions, comprising a pair of closure members having oppositely disposed tire bead engaging seats, means for rotatably mounting said closure members to be axially relatively movable with respect to each other from and toward a position of initial air-sealing engagement of the bead portions in said seats, means for rotating said members with said tire between the same, means connecting with space between said members for inflating said tire, a sidewall buffing element, mounting means for supporting said buffing element to be movable toward and from contact of the element with the tire sidewall portion, means for moving said mounting means to shift the buffing element in direction substantially radially of said axis progressively to remove a predetermined amount of surface rubber from said sidewall portion in a transverse arc thereof, a second sidewall buffing element, supporting means for supporting said second buffing element for movement thereof toward and from said tire sidewall at a point spaced from the point of contact of the first element, one of said members having a backing plate rotatable therewith for backing support of one side of the tire, the other side of the tire being substantially free and unobstructed for said contact of said buffing element with said sidewall portion.

17. Apparatus for buffing sidewall portions of a rubber pneumatic tire having spaced annular bead portions, comprising a pair of closure members having oppositely disposed tire bead engaging seats, means for rotatably mounting said closure members to be axially relatively movable with respect to each other from and toward a position of initial air-sealing engagement of the bead portions in said seats, means for rotating said members with said tire between the same, means connecting with space between said members for inflating said tire, a sidewall buffing element, mounting means for supporting said buffing element to be movable toward and from contact of the element with the tire sidewall portion, means for moving said mounting means to shift the buffing element in direction substantially radially of said axis progressively to remove a predetermined amount of surface rubber from said sidewall portion in a transverse arc thereof, a second sidewall buffing element, supporting means for supporting said second buffing element for movement thereof toward and from said tire sidewall at a point spaced from the point of contact of the first element, the means for rotating said members including power means and a selectively operable clutch mechanism connected between the same and one of said members, the other said member having reciprocatory means connected thereto to move the same with respect to the other member.

18. Apparatus for supporting a pneumatic tire having opposite sidewalls and spaced annular bead portions, comprising a pair of closure members having annular seats adapted to receive said opposite bead portions of a tire received between the members in pressure-fluid sealing relationship, and moving means for relatively moving one said member relatively toward and from the other as for insertion and removal of the tire, said moving means including spring-pressed connection to said one member, said spring-pressed connection having relatively movable parts normally movable in a yieldingly extended relationship when the members are urged together against the inherent resiliency of said tire sidewalls and thereby initially to fluid-pressure seal the bead portions in said seats, and means for supplying pressure-fluid to the tire to inflate the same and urge said members apart against the resiliency of said yieldingly extended parts with consequent yielding contraction of said parts.

19. Apparatus for supporting a pneumatic tire having opposite sidewalls and spaced annular bead portions, comprising a pair of closure members having annular seats adapted to receive said opposite bead portions of a tire received between the members in pressure-fluid sealing relationship, and moving means for relatively moving one said member relatively toward and from the other as for insertion and removal of the tire, said moving means including spring-pressed connection to said one member, said spring-pressed connection having relatively movable parts normally movable in a yieldingly extended relationship when the members are urged together against the inherent resiliency of said tire sidewalls and thereby initially to fluid-pressure seal the bead portions in said seats, and means for supplying pressure-fluid to the tire to inflate the same and urge said members apart against the resiliency of said yieldingly extended parts with consequent yielding contraction of said parts, said relatively movable parts comprising a housing having a plunger axially shiftably therein, and a compression spring between said plunger and an end of said housing.

20. Apparatus for supporting a pneumatic tire having opposite sidewalls and spaced annular bead portions, comprising a pair of closure members having annular seats adapted to receive said opposite bead portions of a tire received between the members in pressure-fluid sealing relationship, means for rotating said members as a unit with a tire seated therebetween, and moving means for relatively moving on said member relatively toward and from the other as for insertion and removal of the tire, said moving means including spring-pressed connection to said one member, said spring-pressed connection having relatively movable parts normally movable in a yieldingly extended relationship when the members are urged together against the inherent resiliency of said tire sidewalls and thereby initially to fluid-pressure seal the bead portions in said seats, and means for supplying pressure-fluid to the tire to inflate the same and urge said members apart against the resiliency of said yieldingly extended parts with consequent yielding contraction of said parts.

21. Apparatus for supporting a pneumatic tire having opposite sidewalls and spaced annular bead portions, comprising a pair of closure members having annular seats adapted to receive said opposite bead portions of a tire received between the members in pressure-fluid sealing relationship, means for rotating said members as a unit with a tire seated therebetween, and moving means for relatively moving one said member relatively toward and from the other as for insertion and removal of the tire, said moving means including spring-pressed connection to said one member, said spring-pressed connection having relatively movable parts normally movable in a yieldingly extended relationship when the members are urged together against the inherent resiliency of said tire sidewalls and thereby initially to fluid-pressure seal the bead portions in said seats, and means for supplying pressure-fluid to the tire to inflate the same and urge said members apart against the resiliency of said yieldingly extended parts with consequent yielding contraction of said parts, said moving means including an axially disposed element connected to said one member through said spring-pressed connection for movement of said one member axially of the other member, and means for axially moving said axially disposed element.

22. Apparatus for buffing a sidewall portion of a rubber pneumatic tire, comprising means for rotating the tire about an axis thereof, a sidewall buffing element having a continuous buffing surface, a support mounted to be movable axially of a transverse pivotal axis, means for transversely moving said support along said pivotal axis, a member mounted on said support to rotate about a second axis at an angle to said pivotal axis and to extend forwardly of said support toward adjacency with the tire sidewall, said member having said buffing element continuously movably mounted thereon for frictional engagement of a buffing portion of the element with the tire sidewall portion in the path of peripheral movement of the same, said member being swingable with said support about said pivotal axis toward and from said frictional engagement of the buffing portion with the sidewall portion, said member being rotatable on said support about said second axis to conform said buffing portion of the element to the transverse arc of the sidewall portion while said support and member are transversely moved along said pivotal axis, thereby progressively to remove a predetermined amount of surface rubber from said sidewall portion in said transverse arc thereof.

23. Apparatus for buffing a sidewall portion of a rubber pneumatic tire, comprising means for rotating the tire about an axis thereof, a sidewall buffing element having a continuous buffing surface, a support mounted to be movable axially of a transverse pivotal axis, means for transversely moving said support along said pivotal axis, a member mounted on said support to rotate about a second axis at an angle to said pivotal axis and to extend forwardly of said support toward adjacency with the tire sidewall, said member having said buffing element continuously movably mounted thereon for frictional engagement of a buffing portion of the element with the tire sidewall portion in the path of peripheral movement of the same, said member being swingable with said support about said pivotal axis toward and from the sidewall portion, said member being rotatable on said frictional engagement of the buffing portion with said support about said second axis to conform said buffing portion of the element to the transverse arc of the sidewall portion while said support and member are transversely moved along said pivotal axis, thereby progressively to remove a predetermined amount of surface rubber from said sidewall portion in said transverse arc thereof, manual means being provided on said member for turning said support on said pivotal axis and for turning the member about said second axis.

24. Apparatus for buffing a sidewall portion of a rubber pneumatic tire, comprising means for rotating the tire about an axis thereof, a sidewall buffing element having a continuous buffing surface, a support mounted to be movable axially of a transverse pivotal axis, means for transversely moving said support along said pivotal axis, a member mounted on said support to rotate about a second axis at an angle to said pivotal axis and to extend forwardly of said support toward adjacency with the tire sidewall, said member having said buffing element continuously movably mounted thereon for frictional engagement of a buffing portion of the element with the tire sidewall portion in the path of peripheral movement of the same, said member being swingable with said support about said pivotal axis toward and from said frictional engagement of the buffing portion with the sidewall portion, said member being rotatable on said support about said second axis to conform said buffing portion of the element to the transverse arc of the sidewall portion while said support and member are transversely moved along said pivotal axis, thereby progressively to remove a predetermined amount of surface rubber from said sidewall portion in said transverse arc thereof, control means being provided for selectively reciprocating said support along said pivotal axis.

25. Apparatus for buffing a sidewall portion of a rubber pneumatic tire, comprising means for rotating the tire about an axis thereof, a sidewall buffing element having a continuous buffing surface, a support mounted to be movable axially of a transverse pivotal axis, means for transversely moving said support along said pivotal axis, a member mounted on said support to rotate about a second axis at an angle to said pivotal axis and to extend forwardly of said support toward adjacency with the tire sidewall, said member having said buffing element continuously movably mounted thereon for frictional engagement of a buffing portion of the element with the tire sidewall portion in the path of peripheral movement of the same, said member being swingable with said support about said pivotal axis toward and from said frictional engagement of the buffing portion with the sidewall portion, said member being rotatable on said support about said second axis to conform said buffing portion of the element to the transverse arc of the sidewall portion while said support and member are transversely moved along said pivotal axis, thereby progressively to remove a predetermined amount of surface rubber from said sidewall portion in said transverse arc thereof, control means being provided for selectively reciprocating said support along said pivotal axis, and means being provided to be operable by movement of said member toward and from said sidewall portion to set said control means for selective forward and reverse reciprocation of said support.

26. Apparatus for buffing a sidewall portion of a rubber pneumatic tire, comprising means for rotating the tire about an axis thereof, a sidewall buffing element having a continuous buffing surface, a support mounted to be movable axially of a transverse pivotal axis, means for transversely moving said support along said pivotal axis, a member mounted on said support to rotate about a second axis at an angle to said pivotal axis and to extend forwardly of said support toward adjacency with the tire sidewall, said member having said buffing element continuously movably mounted thereon for frictional engagement of a buffing portion of the element with the tire sidewall portion in the path of peripheral movement of the same, said member being swingable with said support about said pivotal axis toward and from said frictional engagement of the buffing portion with the sidewall portion, said member being rotatable on said support about said second axis to conform said buffing portion of the element to the transverse arc of the sidewall portion while said support and member are transversely moved along said pivotal axis, thereby progressively to remove a predetermined amount of surface rubber from said sidewall portion in said transverse arc thereof, control means being provided for selectively reciprocating said support along said pivotal axis, said control means including provision for limiting said movement of said support in forward and reverse transverse directions.

27. Apparatus as set forth in claim 12, said first buffing element including a continuous surface of abrasive material, and means being provided for moving said continuous surface against the tire in direction substantially tangent to the arcuate path of movement of the sidewall surface portion, said second buffing element having a continuous buffing surface, and means being provided for moving said buffing surface of the second buffing element toward engagement of a portion of said buffing surface thereof with said sidewall surface portion, the movement of said buffing surface of the second buffing element being in direction of the peripheral movement thereof.

28. Apparatus as set forth in claim 12, said second buffing element having a continuous buffing surface, and means being provided for moving said buffing surface in the second buffing element toward engagement of a portion of said buffing surface thereof with said sidewall surface portion, the movement of said buffing surface of the second buffing element being in direction of the peripheral movement thereof.

29. A method of treating annular sidewalls of a pneumatic tire wherein the sidewalls terminate in annular bead portions comprising the steps of compressing the tire bead portions inwardly against the inherent resiliency of the tire sidewalls to predetermined spaced apart relationship of said bead portions and at the same time initially fluid-pressure sealing the openings defined by said bead portions, and thereafter supplying pressure-fluid to the interior of the fluid pressure sealed tire, yieldingly to urge the tire sidewalls further apart to a predetermined increased spacing of the tire beads and thereby maintaining the pressure seal of the bead portions, treating at least one of said tire sidewalls against the internal pressure in the tire, and releasing said internal pressure after treating to return the tire to normal shape thereof.

30. A method as set forth in claim 29, wherein said internal pressure is released, after treating, by releasing the compression on the tire bead portions to break said pressure seal of the same.

References Cited in the file of this patent

UNITED STATES PATENTS

| | | |
|---|---|---|
| 1,384,278 | Slocombe | July 12, 1921 |
| 2,200,575 | Haskins | May 14, 1940 |
| 2,324,117 | Strong | July 13, 1943 |
| 2,515,167 | Arel | July 18, 1950 |
| 2,707,851 | Strong | May 10, 1955 |